(12) United States Patent
Seok et al.

(10) Patent No.: US 11,882,596 B2
(45) Date of Patent: Jan. 23, 2024

(54) APPARATUS AND METHODS FOR 160+160/320 MHZ EHT OPERATION IN A WIRELESS NETWORK

(71) Applicant: MediaTek Singapore Pte. Ltd., Singapore (SG)

(72) Inventors: Yongho Seok, San Jose, CA (US); Kai Ying Lu, San Jose, CA (US); James Chih-Shi Yee, San Jose, CA (US)

(73) Assignee: MEDIATEK SINGAPORE PTE. LTD., Singapore (SG)

(*) Notice: Subject to any disclaimer, the term of this patent is extended or adjusted under 35 U.S.C. 154(b) by 51 days.

(21) Appl. No.: 17/103,651

(22) Filed: Nov. 24, 2020

(65) Prior Publication Data
US 2021/0168864 A1   Jun. 3, 2021

Related U.S. Application Data

(60) Provisional application No. 62/950,170, filed on Dec. 19, 2019, provisional application No. 62/943,833, filed on Dec. 5, 2019, provisional application No. 62/941,926, filed on Nov. 29, 2019.

(51) Int. Cl.
*H04W 74/08* (2009.01)
*H04W 72/0446* (2023.01)
*H04L 1/1607* (2023.01)

(52) U.S. Cl.
CPC ....... *H04W 74/0816* (2013.01); *H04L 1/1614* (2013.01); *H04W 72/0446* (2013.01)

(58) Field of Classification Search
CPC ......... H04W 74/0816; H04W 72/0446; H04W 74/002; H04W 28/16; H04W 28/02; H04W 28/08; H04L 1/1614
See application file for complete search history.

(56) References Cited

U.S. PATENT DOCUMENTS

| | | | |
|---|---|---|---|
| 2012/0177017 A1* | 7/2012 | Gong | H04W 74/0816 370/338 |
| 2012/0327870 A1* | 12/2012 | Grandhi | H04W 74/0816 370/329 |
| 2016/0316455 A1* | 10/2016 | Asterjadhi | H04W 72/0466 |
| 2016/0316468 A1* | 10/2016 | Huang | H04L 45/74 |
| 2019/0141717 A1* | 5/2019 | Yang | H04L 1/0041 |
| 2021/0029774 A1* | 1/2021 | Lim | H04W 8/24 |
| 2021/0105667 A1* | 4/2021 | Li | H04W 74/002 |
| 2021/0219291 A1* | 7/2021 | Chu | H04L 5/0039 |

* cited by examiner

*Primary Examiner* — Ivan O Latorre

(57) ABSTRACT

Embodiments of the present invention are drawn to electronic systems that perform EHT operations for a wireless network supporting a 160+160 MHz/320 MHz operating mode. RTS/CTS frame exchange sequences and TXOP truncation can be performed using punctured preambles according to subchannels indicated in a bitmap subfield (e.g., an Allowed Bitmap Subfield). Preamble puncturing is supported for EHT PPDUs transmitted to multiple STAs using MU-RTS/MU-CTS frames transmitted in non-HT duplicate PPDUs. Preamble puncturing is also supported for an EHT PPDU transmitted to a single STA. The RTS and CTS frames can be sent in a non-HT duplicate PPDU with preamble puncturing, for example.

19 Claims, 24 Drawing Sheets

| Frame Control | Duration | RA | TA | Disallowed Subchannel Bitmap | FCS |
|---|---|---|---|---|---|
| 2 octets | 2 octets | 6 octets | 6 octets | 2 octets | 4 octets |

FIG. 1

| Enumerated value | Value |
|---|---|
| CBW20 | 0 |
| CBW40 | 1 |
| CBW80 | 2 |
| CBW160 or CBW80+80 | 3 |
| CBW240 or CBW160+80 | 4 |
| CBW320 or CBW160+160 | 5 |

FIG. 5

| CH_BANDWIDTH_IN_NON_HT_INDICATOR field of first 7 bits of scrambling sequence | dot11CurrentChannelCenterFrequencyIndex1 | RXVECTOR parameter CH_BANDWIDTH_IN_NON_HT |
|---|---|---|
| 0 | 0 | CBW20 |
| 1 | 0 | CBW40 |
| 2 | 0 | CBW80 |
| 3 | 0 | CBW160 |
| 3 | 1 to 200 | CBW80+80 |

FIG. 6

| Parameter | Condition | First 7 bits of scrambling sequence 705 | | | | | |
|---|---|---|---|---|---|---|---|
| | | B0 | B3 | B4 | B5 | B6 | |
| | | | Transmit order → | | | | |
| TXVECTOR 710 | CH_BANDWIDTH_I N_NON_HT is present and DYN_BANDWIDTH _IN_NON_HT is not present in TXVECTOR | 5-bit pseudorandom nonzero integer if CH_BANDWIDTH_IN_NON_HT equals CBW20 and a 5-bit pseudorandom integer otherwise | | | CH_BANDWIDTH_ IN_NON_HT | | |
| TXVECTOR 715 | CH_BANDWIDTH_I N_NON_HT is present and DYN_BANDWIDTH _IN_NON_HT is present in TXVECTOR | 4-bit pseudorandom nonzero integer if CH_BANDWIDTH_IN _NON_HT equals CBW20 and DYN_BANDWIDTH_IN _NON_HT equals Static, and a 4-bit pseudorandom integer otherwise | | DYN_BANDWIDTH _IN_NON_HT | | | |
| RXVECTOR 720 | CH_BANDWIDTH_I N_NON_HT and DYN_BANDWIDTH _IN_NON_HT are present in RXVECTOR | — | | DYN_BANDWIDTH _IN_NON_HT | CH_BAND WIDTH_IN_NON_ HT_INDICATOR (see Table 17-9 (RXVECTOR parameter CH_BANDWIDTH_ IN_NON_HT values)). | | |

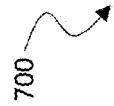

FIG. 7

| Frame Control | Duration | RA | TA | Bandwidth Control | Disallowed or Usable Subchannel Bitmap | FCS |
|---|---|---|---|---|---|---|
| 2 octets | 2 octets | 6 octets | 6 octets | 1 octet | 2 octets | 4 octets |

FIG. 8

| Frame Control | Duration | RA | TA | Disallowed/Usable Subchannel Bitmap | FCS |
|---|---|---|---|---|---|
| 2 octets | 2 octets | 6 octets | 6 octets | 2 octets | 4 octets |

FIG. 14

| Type | Rsvd | G/L (1) | U/M (1) | Partial STA Address | Bandwidth Control | Disallowed/Usable Subchannel Bitmap |
|---|---|---|---|---|---|---|
| 3 bits | 3 bits | 1 bit | 1 bit | 16 bits | 8 bits | 16 bits |

FIG. 15

APPARATUS AND METHODS FOR 160+160/320 MHZ EHT OPERATION IN A WIRELESS NETWORK

CROSS-REFERENCE TO RELATED APPLICATIONS

This application claims the benefit of and priority to provisional patent application Ser. No. 62/950,170, with filing date Dec. 19, 2019, provisional patent application Ser. No. 62/943,833, with filing date Dec. 5, 2019, and provisional patent application Ser. No. 62/941,926, with filing date Nov. 29, 2019, which are hereby incorporated by reference in their entirety.

FIELD

Embodiments of the present invention generally relate to the field of wireless communications. More specifically, embodiments of the present invention relate to systems and methods for extremely high throughput (EHT) operation using preamble puncturing in a wireless network.

BACKGROUND

Preamble puncturing is a technique that uses a portion of an available spectrum for wireless communication while preserving or restricting a portion of the spectrum (e.g., a 20 MHz portion) to avoid causing interference with legacy devices that are using that portion for legacy-based communications. For example, preamble puncturing can be used to enable an 802.11ax access point (AP) to operate at 80 MHz or 160 MHz without causing interference with legacy devices by configuring the 802.11ax access point to transmit using a punctured 80 MHZ channel or 160 MHz channel when a portion of the wireless channel is already in use by a legacy device.

Several modes of preamble puncturing are possible. In Mode 1, a secondary 20 MHz portion of an 80 MHz channel is punctured to avoid interference from a nearby legacy device. In Mode 2, a left 20 MHz portion or a right 20 MHz portion is punctured from the secondary 40 MHz channel of an 80 MHz channel. In Mode 3, a 20 MHz portion of the secondary 20 MHz channel is punctured from a 160 MHz channel. In Mode 4, at least one 20 MHz portion of the secondary 40 MHz channel is punctured from a 160 MHz channel. Therefore, different preamble puncturing modes offer different bandwidths depending on the size of the available band and what portions of the band are punctured.

Therefore, a need exists to enable a device to provide bandwidth indications to identify those bandwidths that are supported for a TXOP and which portions are punctured to avoid interference with legacy devices. Furthermore, a need exists for truncating TXOPs using preamble puncturing for EHT wireless devices.

SUMMARY

Accordingly, embodiments of the present invention provide methods of bandwidth indication and TXOP truncation using preamble puncturing for EHT operations of a 160+160/320 MHz channel in a wireless network. RTS/CTS frame exchange sequences and TXOP truncation can be performed using punctured preambles according to subchannels indicated in a bitmap subfield (e.g., an Allowed Bitmap Subfield). Preamble puncturing is supported for EHT PPDUs transmitted to multiple STAs using MU-RTS/MU-CTS frames transmitted in non-HT duplicate PPDUs. Preamble puncturing is also supported for an EHT PPDU transmitted to a single STA. The RTS and CTS frames can be sent in a non-HT duplicate PPDU with preamble puncturing, for example.

According to one embodiment, a method of transmitting data in a wireless network is disclosed. The method includes transmitting an RTS frame from a wireless station (STA) for receipt by a wireless access point (AP), the RTS frame including a subchannel bitmap indicating allowed channels for transmitting a CTS frame, and receiving the CTS frame at the wireless STA from the wireless AP on a first subchannel indicated in the subchannel bitmap.

According to some embodiments, the transmitting includes transmitting the RTS frame in a non-HT duplicate PPDU with a punctured preamble.

According to some embodiments, the transmitting includes transmitting the RTS frame in a preamble punctured SU PPDU.

According to some embodiments, the transmitting includes transmitting the RTS frame in a 160 MHz operating channel of the wireless network.

According to some embodiments, the punctured preamble is a 20 MHz portion of the 160 MHz operating channel.

According to some embodiments, the 160 MHz operating channel includes: a primary 80 MHz channel, and a secondary 80 MHz channel, and the subchannel bitmap indicates that an upper 20 MHz channel of the secondary 80 MHz is disallowed for transmission of the CTS frame.

According to some embodiments, the subchannel bitmap further indicates that an upper 40 MHz channel of the secondary 80 MHz channel is disallowed for transmission of the CTS frame.

According to some embodiments, the RTS frame includes an MU-RTS frame and the CTS frame includes an MU-CTS frame.

According to some embodiments, the method includes receiving the CTS frame on a plurality of subchannels indicated in the subchannel bitmap.

According to some embodiments, the RTS frame further includes a bandwidth control field having a mode subfield for indicating a dynamic bandwidth indication, the CTS frame includes a second subchannel bitmap indicating a plurality of idle subchannels of the subchannels indicated in the subchannel bitmap of the RTS frame, and the CTS frame is transmitted on at least one of the plurality of idle subchannels.

According to some embodiments, the RTS frame further includes a bandwidth control field having a mode subfield for indicating a static bandwidth indication, and the CTS frame includes a second subchannel bitmap indicating the same channels indicated in the subchannel bitmap of the RTS frame.

According to some embodiments, the RTS frame further includes a bandwidth control field having a preamble puncture enabled subfield for indicating that preamble puncturing is enabled, and the CTS frame is transmitted in a non-HT duplicate PPDU using preamble puncturing.

According to another embodiment, a method of transmitting data in a wireless network is disclosed. The method includes receiving an RTS frame at a wireless access point (AP) from a wireless station (STA), the RTS frame includes a subchannel bitmap indicating allowed channels for transmitting a CTS frame responsive to the RTS frame, and transmitting a CTS frame from the wireless AP to the wireless STA over a first wireless channel, the first wireless channel is indicated as an allowed subchannel in the subchannel bitmap.

According to some embodiments, the method includes transmitting the CTS frame on a plurality of subchannels indicated as allowed subchannels in the subchannel bitmap.

According to some embodiments, the RTS frame further includes a bandwidth control field having a mode subfield for indicating a dynamic bandwidth indication, the CTS frame includes a second subchannel bitmap indicating a plurality of idle subchannels of the subchannels indicated in the subchannel bitmap of the RTS frame, and further including transmitting the CTS frame on at least one of the plurality of idle subchannels.

According to some embodiments, the RTS frame further includes a bandwidth control field having a mode subfield for indicating a static bandwidth indication, the CTS frame includes a second subchannel bitmap indicating the same channels indicated in the subchannel bitmap of the RTS frame.

According to some embodiments, the RTS frame further includes a bandwidth control field having a preamble puncture enabled subfield for indicating that preamble puncturing is enabled, said transmitting the CTS frame includes transmitting the CTS frame in a non-HT duplicate PPDU using preamble puncturing.

According to a different embodiment, a method of truncating a transmission opportunity (TXOP) is disclosed. The method includes transmitting an EHT CF-End frame including a subchannel bitmap indicating allowed subchannels from a TXOP holder to a wireless access point (AP), transmitting a legacy CF-end frame from the TXOP holder to the wireless AP, and receiving a legacy CF-end frame.

According to some embodiments, the wireless AP stores the subchannel bitmap, and the CF-end frame is transmitted based on the subchannel bitmap stored at the wireless AP.

According to some embodiments, the EHT CF-frame includes an RA field indicating a broadcast group address and a TA field indicating local bandwidth signaling information.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 1 is a block diagram of an exemplary EHT RTS frame format for providing a disallowed subchannel bitmap for performing preamble puncturing in a wireless network according to embodiments of the present invention.

FIG. 5 is a table depicting exemplary TXVECTOR parameter values for indicating respective channel bandwidths according to embodiments of the present invention.

FIG. 6 is a table 600 depicting exemplary RXVECTOR parameter values of the first 7 bits of the scrambling sequence for indicating respective channel bandwidths in CH_BANDWIDTH_IN_NON_HT.

FIG. 7 is a table depicting exemplary values of the first 7 bits of the scrambling sequence for TXVECTOR for static bandwidth indication, TXVECTOR for dynamic bandwidth indication, and RXVECTOR for dynamic bandwidth indication.

FIG. 8 depicts an exemplary HE RTS/CTS frame including a Bandwidth Control Field having a Mode subfield and a Preamble Puncture Enabled subfield according to embodiments of the present invention.

FIG. 14 is a block diagram of an exemplary EHT CF-End frame format having a Disallowed/Usable Subchannel Bitmap field according to embodiments of the present invention.

FIG. 15 is a block diagram of an exemplary EHT CF-End frame including local bandwidth signaling information according to embodiments of the present invention.

DETAILED DESCRIPTION

Figure 2:
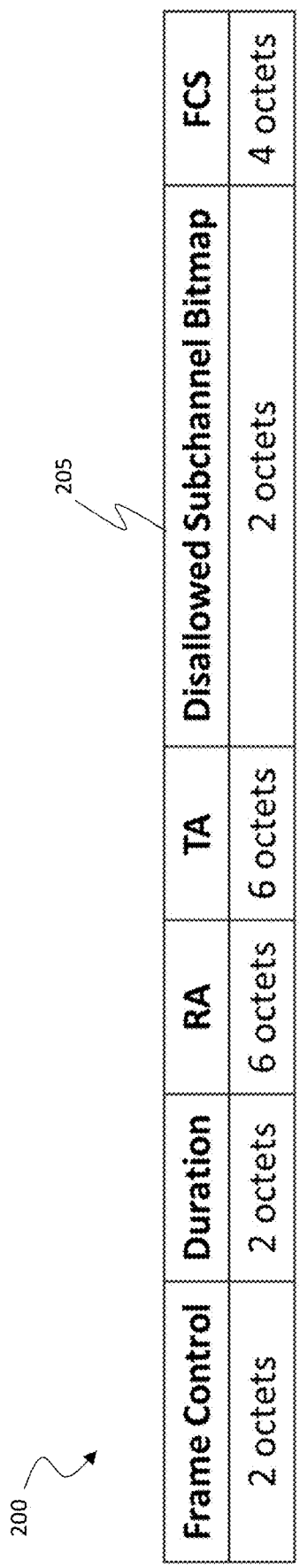
FIG. 2 is a block diagram depicting an exemplary EHT CTS frame format carried in a non-HT duplicate PPDU with preamble puncturing according to embodiments of the present invention.

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known methods, procedures, components, and circuits have not been described in detail as not to unnecessarily obscure aspects and features of the subject matter.

Portions of the detailed description that follow are presented and discussed in terms of a method. Although steps and sequencing thereof are disclosed in a figure herein (e.g., FIGS. 20-23) describing the operations of this method, such steps and sequencing are exemplary. Embodiments are well suited to performing various other steps or variations of the steps recited in the flowchart of the figure herein, and in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "configuring," "coordinating," "storing," "transmitting," "retransmitting," "authenticating," "identifying," "requesting," "reporting," "determining," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Novel EHT Operations for 160+160/320 MHz Channels

As used herein, the term "EHT" refers generally to a recent generation of wireless communication (Wi-Fi) known as Extremely High Throughput (EHT) and is defined according to the IEEE 802.11be standards. The terms Very High Throughput (VHT) and High Throughput (HT) refer to legacy wireless devices defined according to 802.11ac and 802.11n, respectively. The term station (STA) refers generally to an electronic device capable of sending and receiving data over Wi-Fi that is not operating as an access point (AP).

Currently 802.11be devices support 320 MHz operation and 160+160 MHz PPDUs and therefore need a means to support 320 MHz and 160+160 MHz bandwidth indication. 802.11be devices also support 240 MHz and 160+80 MHz transmissions, where 240/160+80 MHz bands are formed by 80 MHz channel puncturing of 320/160+160 MHz channels. 802.11be devices therefore also need a means to support 240 MHz and 160+80 MHz bandwidth indication.

Embodiments of the present invention are drawn to electronic systems that perform EHT operations for a wireless network supporting a 160+160 MHz/320 MHz operating mode. Request to send (RTS)/Clear to send (CTS) frame exchange sequences and TXOP truncation can be performed using punctured preambles according to subchannels indicated in a bitmap subfield (e.g., an Allowed Bitmap Subfield). Preamble puncturing is supported for EHT physical-layer protocol data units (PPDUs) transmitted to multiple STAs using multi-user (MU)-RTS/MU-CTS frames transmitted in non-HT duplicate PPDUs. Preamble puncturing is also supported for an EHT PPDU transmitted to a single wireless STA. The RTS and CTS frames can be sent in a non-HT duplicate PPDU with preamble puncturing, for example.

FIG. 1 is a block diagram of an exemplary EHT RTS frame format 100 for providing a disallowed subchannel bitmap 105 to enable preamble puncturing in a wireless network according to embodiments of the present invention. In the example of FIG. 1, a transmission opportunity (TXOP) initiator STA transmits an EHT RTS frame to a peer STA using a non-high throughput (non-HT) duplicate PPDU with preamble puncturing. The Disallowed Subchannel Bitmap 105 indicates which 20 MHz subchannels and which 242-tone RUs are disallowed in the CTS frame response. In the Disallowed Subchannel Bitmap 105, the bit fields corresponding to the 20 MHz subchannels on which the EHT RTS frames are not sent are set to 1. The bit fields corresponding to the 20 MHz subchannels on which the EHT RTS are sent are set to 0. Alternatively, according to some embodiments, a Usable Subchannel Bitmap field is used in place of the Disallowed Subchannel Bitmap, where the values are reversed so that the bit fields corresponding to the 20 MHz subchannels on which the EHT RTS frames are sent are set to 1.

The peer STA responds to the TXOP initiator STA using an exemplary EHT CTS frame format 200 carried in a non-HT duplicate PPDU with preamble puncturing as depicted in FIG. 2 according to embodiments of the present invention. The Disallowed Subchannel Bitmap 205 indicates which 20 MHz subchannels and which 242-tone RUs are disallowed in the frame transmission, e.g., data and management frame transmissions, by the TXOP initiator STA. In the Disallowed Subchannel Bitmap, bit fields corresponding to 20 MHz subchannels on which the EHT CTS frames are not sent are set to 1. Bit fields corresponding to 20 MHz subchannels on which the EHT CTS frames are sent are set to 0. Alternatively, according to some embodiments, a Usable Subchannel Bitmap field is used in place of the Disallowed Subchannel Bitmap field, where the values are reversed so that the bit fields corresponding to the 20 MHz subchannels on which the EHT RTS frames are sent are set to 1.

The EHT CTS frame response to the EHT RTS frame is sent on the primary 20 MHz channel, primary 40 MHz channel, primary 80 MHz channel, primary 160 MHz channel, primary 80+80 MHz channel, primary 240 MHz channel, primary 160+80 MHz channel, 320 MHz channel, or 160+160 MHz channel, unless the channel is indicated in the disallowed subchannels bitmap in the received EHT RTS frame. When the EHT RTS frame and the EHT CTS frame uses a Usable Subchannel Bitmap, the disallowed subchannels are the subchannels that are not indicated as usable in the Usable Subchannel Bitmap (e.g., have a value of 0).

Figure 3:
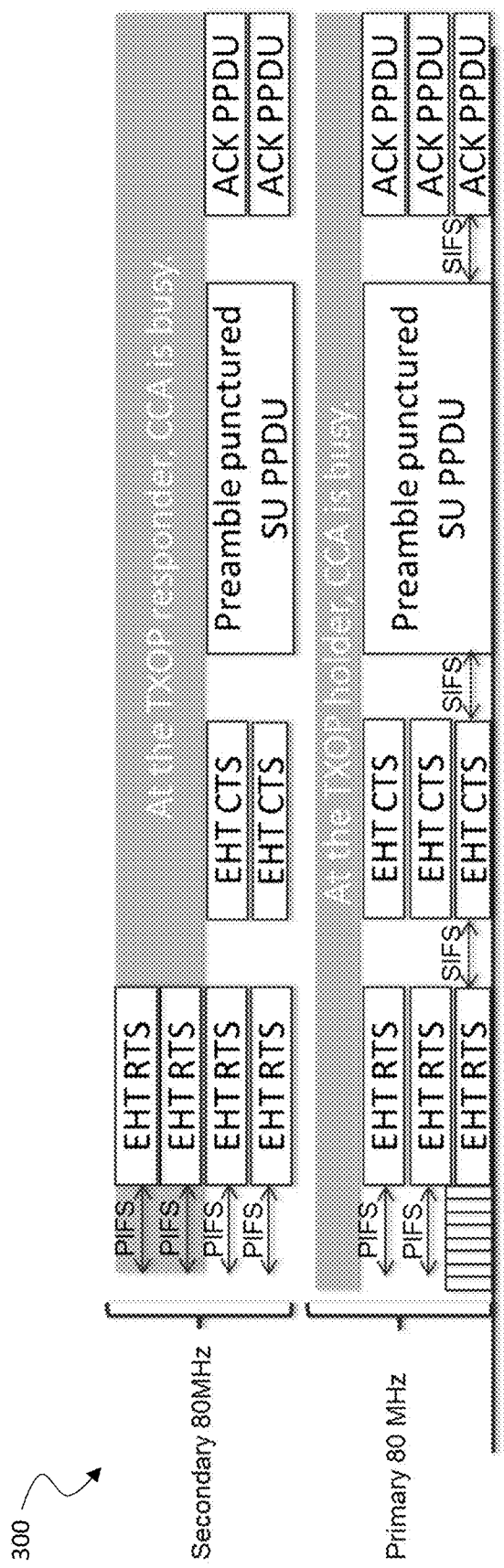
FIG. 3 is a block diagram of an exemplary RTS/CTS frame exchange sequence using a primary 80 MHz channel and a secondary 80 MHz channel according to embodiments of the present invention.

FIG. 3 is a block diagram of an exemplary RTS/CTS frame exchange sequence 300 using a primary 80 MHz channel and a secondary 80 MHz channel according to embodiments of the present invention. The CTS frame is sent in a non-HT duplicate PPDU with preamble puncturing. The STA solicits the EHT CTS responses on the primary 80 MHz and secondary 80 MHz channel. Because the AP indicates that the upper 20 MHz channel of the secondary 40 MHz channel is the disallowed subchannel (e.g., using a Disallowed Subchannel Bitmap), the STA responds with the CTS frame on the allowed subchannels while excluding any disallowed subchannels. The disallowed subchannel can be a channel where the primary service is presently occupied, or where a CCA is ongoing.

According to some embodiments, the allowed/disallowed subchannels are determined according to BSS operating parameters announced by the wireless AP. In these embodiments, the set of allowed/disallowed subchannels is static.

As depicted in FIG. 3, the STA that sends the EHT CTS frame indicates that the upper 40 MHz channel of the secondary 80 MHz channel (in addition to the upper 20 MHz channel of the secondary 40 MHz channel) is a disallowed subchannel (e.g., using a Disallowed Subchannel Bitmap), and therefore the TXOP holder can only use the primary 40 MHz channel, the lower 20 MHz channel of the secondary 40 MHz channel, and the lower 40 MHz channel of the secondary 80 MHz channel for the subsequent frame exchange. The subsequent frame exchange can be sent in either a non-HT duplicate PPDU with preamble puncturing or a preamble punctured SU PPDU. When the RTS frame solicits an immediate response (e.g., in a non-HT duplicate PPDU with preamble puncturing), the RTS frame includes an A-Control field carrying a Disallowed Subchannel Bitmap. The Disallowed Subchannel Bitmap indicates which 20 MHz subchannels and which 242-tone RUs are disallowed for transmitting the immediate response. In the Disallowed Subchannel Bitmap, bit fields corresponding to 20 MHz subchannels on which the frames are not sent are set to 1. Accordingly, the immediate responses are not sent in 20 MHz subchannels on which bit fields in the Disallowed Subchannel Bitmap in the A-Control field in the soliciting frame EHT CTS frames are set to 1.

Figure 4:
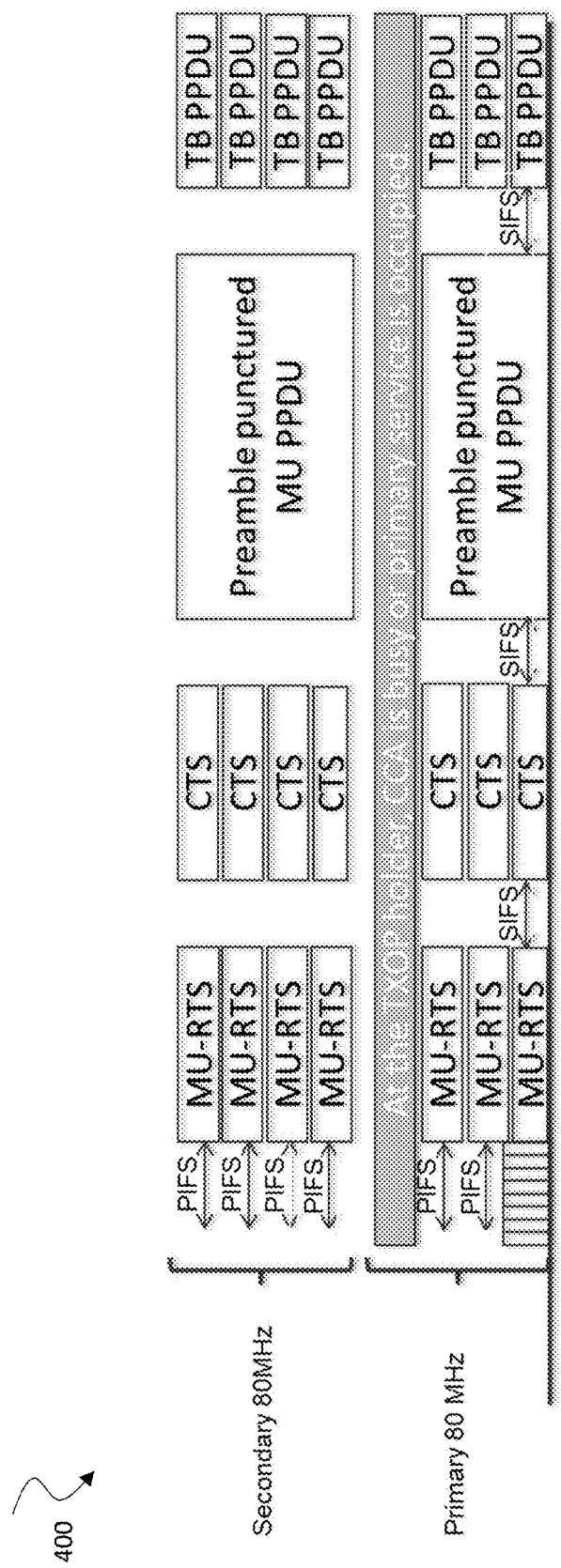
FIG. 4 is a block diagram of an exemplary MU-RTS/CTS frame exchange sequence using a primary 80 MHz channel and a secondary 80 MHz channel according to embodiments of the present invention.

FIG. 4 is a block diagram of an exemplary MU-RTS/CTS frame exchange sequence 400 using a primary 80 MHz channel and a secondary 80 MHz channel according to embodiments of the present invention. The CTS frame is sent in a non-HT duplicate PPDU with preamble puncturing. As depicted in FIG. 4, the AP solicits the CTS response on the primary 80 MHz and secondary 80 MHz channel. Because the AP indicates that the upper 20 MHz channel of the secondary 40 MHz channel is a disallowed subchannel (e.g., using a Disallowed Subchannel Bitmap), the STA responds with the CTS frame on the available subchannels excluding the corresponding disallowed subchannel.

The AP can transmit an EHT MU-RTS Trigger frame to solicit simultaneous CTS frame responses from one or more non-AP STAs. The RU Allocation subfield in the User Info field addressed to the non-AP STA indicates whether the CTS frame response is to be sent on the primary 20 MHz channel, primary 40 MHz channel, primary 80 MHz channel, primary 160 MHz channel, primary 80+80 MHz channel, primary 240 MHz channel, primary 160+80 MHz channel, 320 MHz channel, or 160+160 MHz channel, and the subchannels indicated in the Disallowed Subchannels Bitmap carried in the received EHT MU-RTS frame are excluded.

When the EHT MU-RTS Trigger frame is sent in a non-HT duplicate PPDU with preamble puncturing, the MU-RTS Trigger frame includes the Disallowed Subchannel Bitmap in the User Info field (the AID12 subfield is set to 2047). The Disallowed Subchannel Bitmap indicates which 20 MHz subchannels and which 242-tone RUs are disallowed for transmitting the CTS frame response. Alternatively a Usable Subchannel Bitmap can be used to indicate which 20 MHz subchannels and which 242-tone RUs are usable for transmitting the CTS frame response.

Static and Dynamic Bandwidth Indication for EHT 160+$^{160}/_{320}$ MHz Operation For static bandwidth indication, a VHT STA that is addressed by an RTS frame in a non-HT or non-HT duplicate PPDU that has a bandwidth signaling TA ca have a RXVECTOR parameter DYN_BANDWIDTH_IN_NON_HT equal to Static. In this case, if the NAV indicates idle and CCA has been idle for all secondary channels (secondary 20 MHz channel, secondary 40 MHz channel, and secondary 80 MHz channel) in the channel width indicated by the RTS frame's RXVECTOR parameter CH_BANDWIDTH_IN_NON_HT (for a PIFS prior to the start of the RTS frame), then the STA responds with a CTS frame carried in a non-HT or non-HT duplicate PPDU after a SIFS. The CTS frame's TXVECTOR parameters CH_BANDWIDTH and CH_BANDWIDTH_IN_NON_HT are set to the same value as the RTS frame's RXVECTOR parameter CH_BANDWIDTH_IN_ NON_HT. Otherwise, the STA does not respond with a CTS frame when the indicated channel is busy.

For dynamic bandwidth indication, a VHT STA addressed by an RTS frame in a non-HT or non-HT duplicate PPDU has a bandwidth signaling TA and the RXVECTOR parameter DYN_BANDWIDTH_IN_NON_HT equal to Dynamic. In this case, if the NAV indicates idle, the STA responds with a CTS frame in a non-HT or non-HT duplicate PPDU after a SIFS. The CTS frame's TXVECTOR parameters CH_BANDWIDTH and CH_BANDWIDTH_IN_ NON_HT are set to any channel width for which CCA on all secondary channels has been idle for a PIFS prior to the start of the RTS frame, and where the channel width is less than or equal to the channel width indicated in the RTS frame's RXVECTOR parameter CH_BANDWIDTH_IN_NON_HT. Otherwise, the STA does not respond with a CTS frame if the indicated channel is busy.

FIG. 5 is a table 500 depicting exemplary TXVECTOR parameter values 510 for indicating respective channel bandwidths 505 (e.g., B4-B6 of the scrambling sequence). B3 indicates the DYN_BANDWIDTH_IN_NON_HT values (e.g., 0 for Static and 1 for Dynamic) according to embodiments of the present invention.

FIG. 6 is a table 600 depicting exemplary RXVECTOR parameter values of the first 7 bits of the scrambling sequence 610 for indicating respective channel bandwidths 605 in CH_BANDWIDTH_IN_NON_HT according to embodiments of the present invention.

FIG. 7 is a table 700 depicting exemplary values of the first 7 bits of the scrambling sequence 705 for TXVECTOR for static bandwidth indication 710, TXVECTOR for dynamic bandwidth indication 715, and RXVECTOR for dynamic bandwidth indication 720 according to embodiments of the present invention.

According to some embodiments, to indicate that the extended CH_BANDWIDTH_IN_NON_HT parameter is carried in the scrambling sequence, the RTS frame swaps the RA and TA field. Specifically, the RA field of the RTS frame is set to the MAC addressed of the transmitting STA. The TA field of the RTS frame is set to the MAC addressed of the target STA. When the STA receives a RTS frame having a TA field equal to the MAC address of the STA, the STA interprets the first 7 bits of the scrambling sequence as the extended CH_BANDWIDTH_IN_NON_HT parameter (B4-B6) and DYN_BANDWIDTH_IN_NON_HT parameter (B3), as depicted in FIGS. 5-7 according to embodiments of the present invention.

FIG. 8 depicts an exemplary EHT RTS/CTS frame including a Bandwidth Control Field 805 having a Mode subfield and a Preamble Puncture Enabled subfield according to embodiments of the present invention. The Mode subfield is set to 1 to indicate that the dynamic bandwidth indication is used. When the dynamic bandwidth indication is used, the EHT CTS frame indicates any channel set where CCA has been idle for a PIFS prior to the start of the EHT RTS frame and that is a subset of the available channel set indicated in the Disallowed or Usable Subchannel Bitmap field in the EHT RTS frame. The EHT RTS frame is sent on that available channel set; otherwise, the Mode subfield is set to 0 to indicate that the static bandwidth indication is used.

When the static bandwidth indication is used, the EHT CTS frame indicates the same channel set as the available channel set indicated in the Disallowed or Usable Subchannel Bitmap field in the EHT RTS frame if CCA for the corresponding channel set has been idle for a PIFS prior to the start of the EHT RTS frame. The Bandwidth Control field includes the Mode subfield and the Preamble Puncture Enabled subfield. The Preamble Puncture Enabled subfield is set to 1 to indicate that the preamble punctured PPDU transmission is enabled. When preamble puncturing is enabled, the TXOP responder may send the EHT CTS response in a non-HT duplicate PPDU with a punctured preamble.

When a TXOP holder sends an EHT RTS frame in a non-HT duplicate PPDU with a preamble puncture, the Preamble Puncture Enabled subfield in the Bandwidth Control field is set to 1. Otherwise the Preamble Puncture Enabled subfield is set to 0 to indicate that the preamble punctured PPDU transmission is not enabled. When the preamble puncture is not enabled, the TXOP responder is unable to send the EHT CTS response in a non-HT duplicate PPDU with a preamble puncture. When the TXOP holder does not support the preamble punctured PPDU transmission, it sets the Preamble Puncture Enabled subfield in the Bandwidth Control field to 0.

FIGS. 9-12 are block diagrams depicting exemplary EHT RTS/CTS frame exchange sequences for soliciting EHT CTS responses on various channels according to values of a Mode Subfield and a Bandwidth Control Field of the corresponding EHT RTS frame according to embodiments of the present invention.

Figure 9:
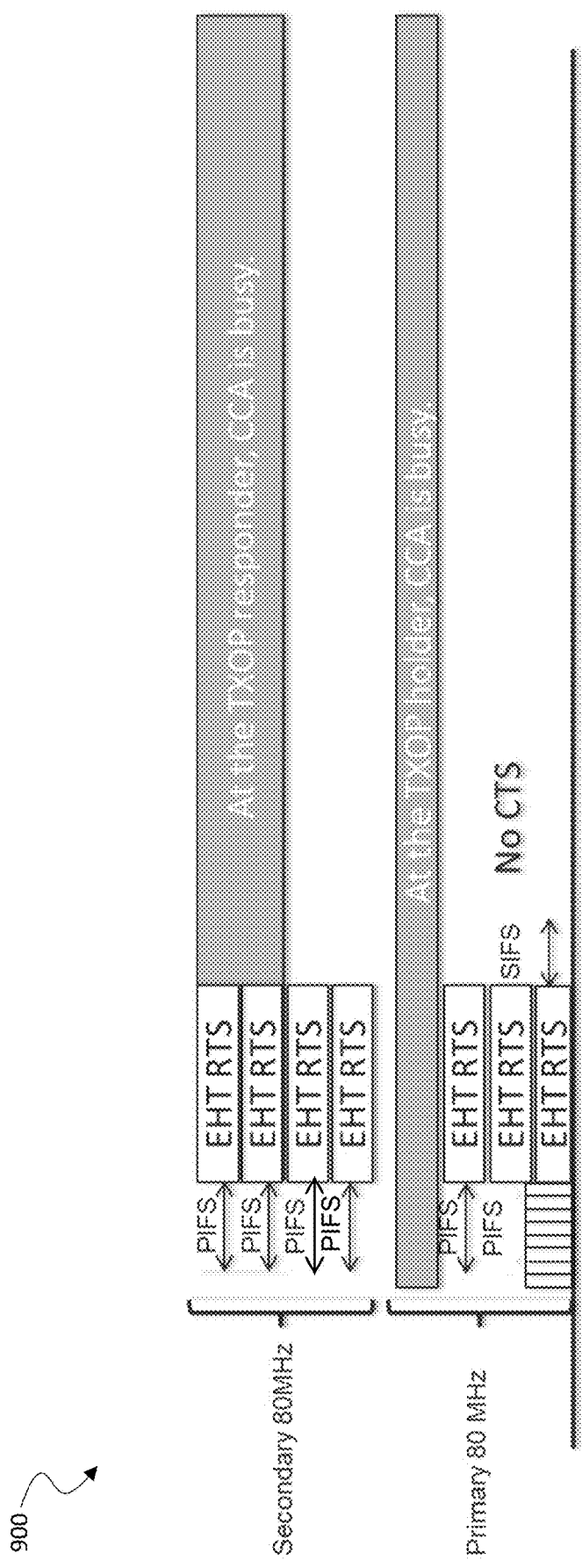
FIG. 9 is a block diagram of an exemplary transmission of a TXOP holder soliciting an EHT CTS response on a primary 80 MHz and secondary 80 MHz channel according to embodiments of the present invention.

In exemplary transmission 900 depicted in FIG. 9, the TXOP holder solicits the EHT CTS response on the primary 80 MHz and secondary 80 MHz channel in transmission 900. The Mode Subfield in the Bandwidth Control field is set to 0 (static bandwidth indication) and the Preamble Puncture Enabled subfield in the Bandwidth Control field is set to 1 (preamble puncturing enabled). The Disallowed Subchannel Bitmap field is set to 0001 0000. Because the TXOP holder indicates static bandwidth indication in the EHT RTS frame, the TXOP responder does not reply with the EHT CTS frame when the upper 40 MHz channel of the secondary 80 MHz channel is not idle.

Figure 10:
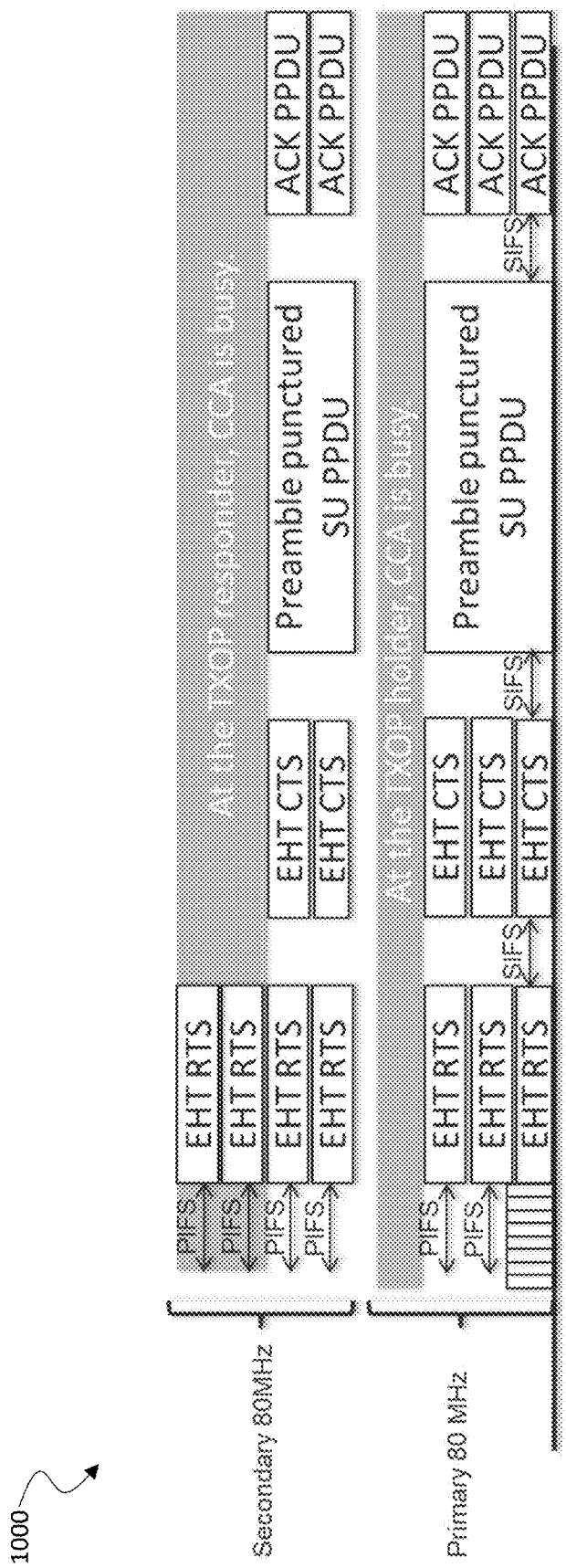
FIG. 10 is a block diagram of an exemplary transmission indicating that the upper 20 MHz channel of the secondary 40 MHz channel is a disallowed subchannel and dynamic bandwidth indication is enabled according to embodiments of the present invention.

In exemplary transmission 1000 depicted in FIG. 10, the TXOP holder solicits EHT CTS responses on the primary 80 MHz and secondary 80 MHz channel in transmission 1000. The Mode Subfield in the Bandwidth Control field is set to 1 and the Preamble Puncture Enabled subfield in the Bandwidth Control field is set to 1. The Disallowed Subchannel Bitmap field is set to 0001 0000. Because the TXOP holder indicates that the upper 20 MHz channel of the secondary 40 MHz channel is a disallowed subchannel and dynamic bandwidth indication is enable, the TXOP responder replies with the EHT CTS frame on idle channels where the non-HT duplicate PPDU can be sent using a punctured preamble.

Figure 11:
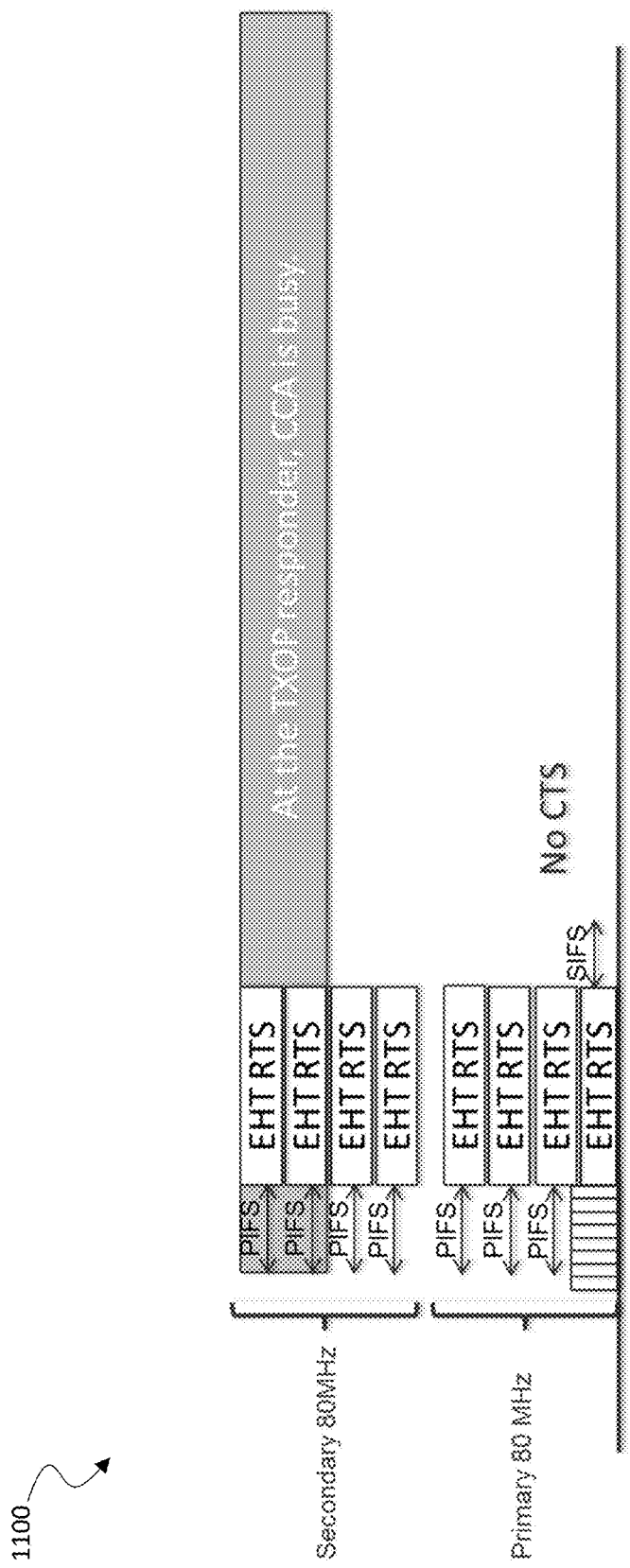
FIG. 11 is a block diagram of an exemplary transmission of a TXOP holder that does not support the preamble punctured PPDU transmission according to embodiments of the present invention.

In exemplary transmission 1100 depicted in FIG. 11, the TXOP holder does not support the preamble punctured PPDU transmission. The TXOP holder solicits an EHT CTS response on the primary 80 MHz and secondary 80 MHz channel in transmission 1100. The Mode Subfield in the Bandwidth Control field is set to 0 and the Preamble Puncture Enabled subfield in the Bandwidth Control field is set to 0. The Disallowed Subchannel Bitmap field is set to 0000 0000. Because the TXOP holder indicates that the static bandwidth indication is used, the TXOP responder does not reply with the EHT CTS frame when the upper 40 MHz channel of the secondary 80 MHz channel is not idle.

Figure 12:
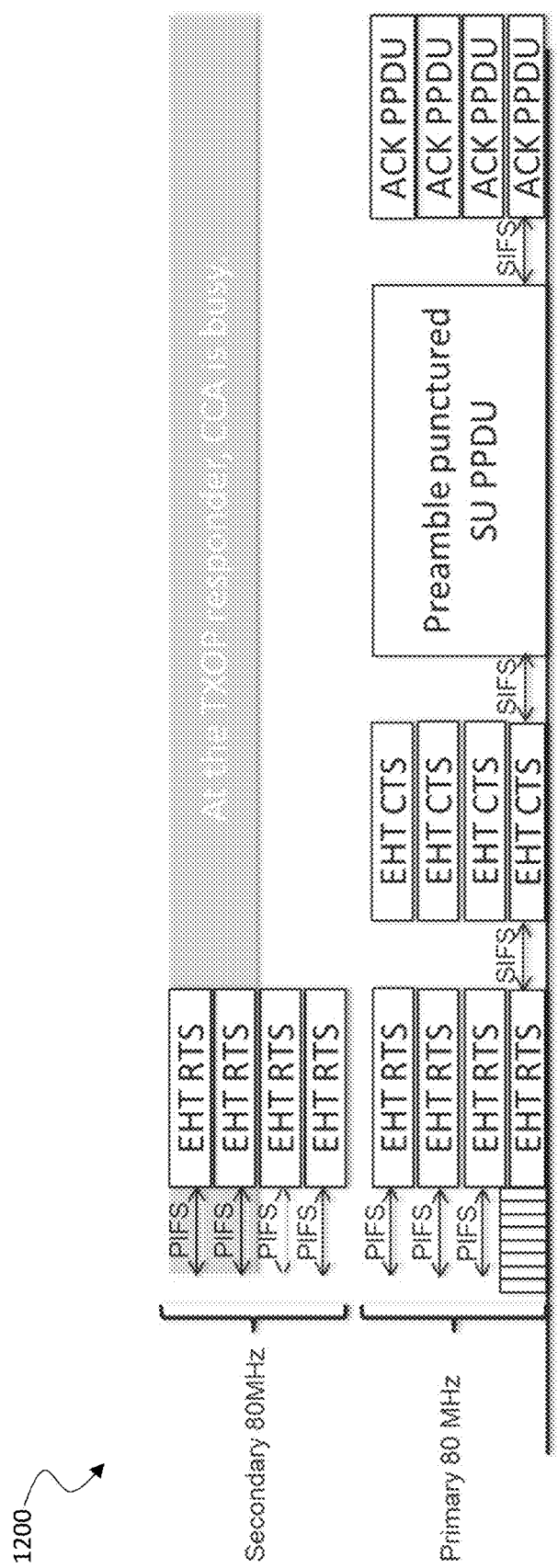
FIG. 12 is a block diagram of a TXOP holder that does not support the preamble punctured PPDU transmission and that solicits a EHT CTS response on a primary 80 MHz channel and a secondary 80 MHz channel.

In exemplary transmission 1200 depicted in FIG. 12, the TXOP holder that does not support the preamble punctured PPDU transmission solicits the EHT CTS response on the primary 80 MHz channel and the secondary 80 MHz channel. The Mode Subfield in the Bandwidth Control field is set to 1 and the Preamble Puncture Enabled subfield in the Bandwidth Control field is set to 0. The Disallowed Subchannel Bitmap field is set to 0000 0000. Because the TXOP holder indicates that the dynamic bandwidth indication is used, the TXOP responder replies with the EHT CTS frame on idle channels in which the non-HT duplicate PPDU can be sent without the preamble puncturing.

Figure 13:
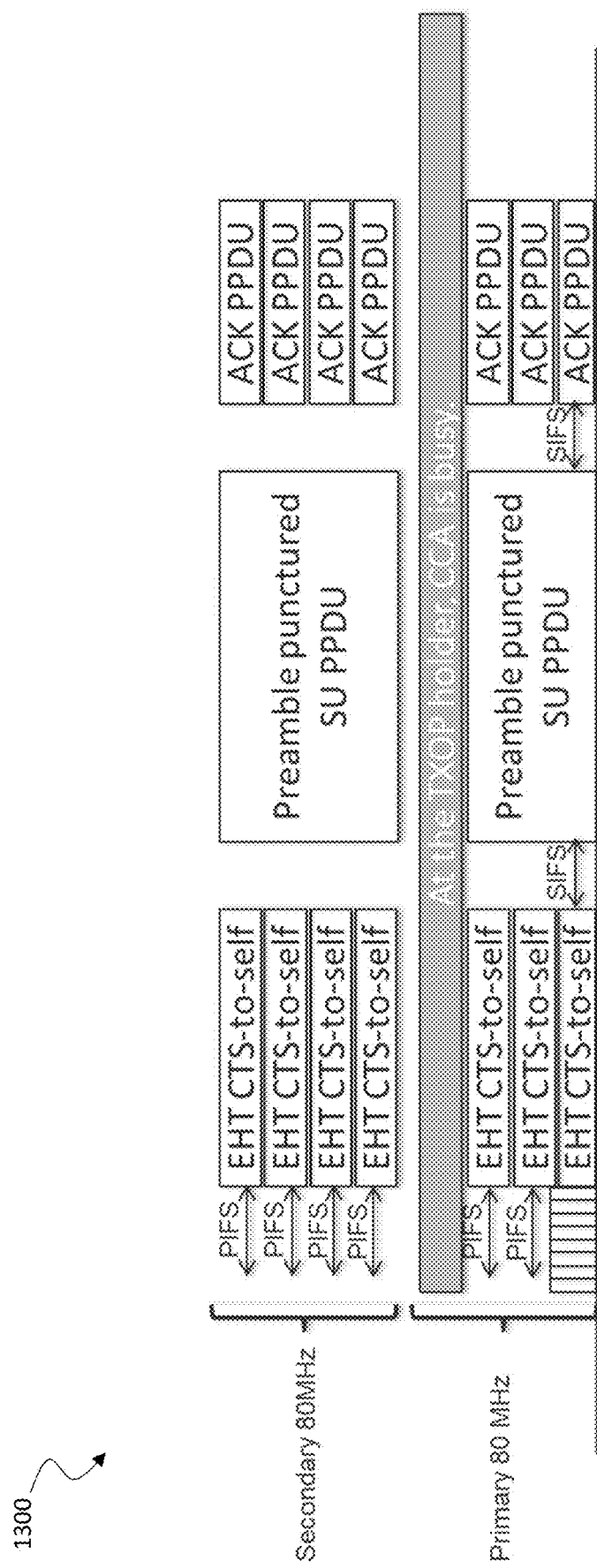
FIG. 13 is a block diagram of an exemplary CTS-to-self transmission using a primary 80 MHz channel and a secondary 80 MHz channel according to embodiments of the present invention.

FIG. 13 is a block diagram of an exemplary EHT CTS-to-self transmission using a primary 80 MHz channel and a secondary 80 MHz channel according to embodiments of the present invention. The TXOP holder transmits an EHT CTS-to-self frame in a non-HT duplicate PPDU to a TXOP responder. The CH_BANDWIDTH parameter is set to CBW40, CBW80, CBW160, CBW80+80, CBW240, CBW160+80, CBW320, and/or CBW160+160. The INACTIVE_SUBCHANNELS field is used to indicates the 20

MHz subchannels that are punctured, if any. As depicted in FIG. 13, the TXOP holder transmits the EHT CTS-to-self frame on the primary 80 MHz and secondary 80 MHz channel. Because the TXOP holder indicates that the upper 20 MHz channel of the secondary 40 MHz channel is a disallowed subchannel, the TXOP holder transmits the subsequent frames on the idle channels other than the disallowed subchannel.

FIG. 14 is a block diagram of an exemplary EHT CF-End frame format 1400 having a Disallowed/Usable Subchannel Bitmap field 1405 according to embodiments of the present invention. The Disallowed Subchannel Bitmap indicates the 20 MHz subchannels on which the EHT CF-End frames are not sent. For example, a bit corresponding to the 20 MHz subchannel on which the EHT CF-End frame is not sent is set to 1; otherwise, it is set to 0. An EHT AP that transmits another EHT CF-End frame after receiving an EHT CF-End frame is restricted from transmitting the EHT CF-End frames on the 20 MHz subchannels indicated in the Disallowed Subchannel Bitmap in the received EHT CF-End frame.

Alternatively, the EHT CF-End frame can include a Usable Subchannel Bitmap that indicates the 20 MHz subchannels on which the EHT CF-End frames are sent. For example, a bit corresponding to the 20 MHz subchannel on which the EHT CF-End frame is sent is set to 1; otherwise, it is set to 0. An EHT AP that transmits another EHT CF-End frame after receiving an EHT CF-End frame can transmit the EHT CF-End frames on the 20 MHz subchannels indicated in the Usable Subchannel Bitmap in the received EHT CF-End frame.

According to some embodiments, in order to carry the Disallowed/Usable Subchannel Bitmap in an EHT CF-End frame, the receiver address (RA) 1410 field is set to the broadcast group address, and the transmitter address (TA) field 1415 is set to the local bandwidth signaling information. The local bandwidth signaling information can include one bit indicating unicast (0) or multicast (1), and another bit indicating globally unique (0) or locally administered (1) addressing. Typically the multicast or broadcast MAC address is not used in the TA field. The Globally unique (0)/Locally administered (1) bit is set to 0 for bandwidth signaling in 802.11ac and 802.11ax.

FIG. 15 is a block diagram of an exemplary EHT CF-End frame 1500 including local bandwidth signaling information according to embodiments of the present invention. The EHT CF-End frame 1500 includes indicating unicast/multicast field 1505 and globally unique/locally administered field 1510. Partial STA address field 1515 includes an identifier of the address of the STA contained in the AP. The address can be identified based on the basic service set (BSS) Color and the MAC address of the STA contained in the AP, for example. The Disallowed/Usable Subchannel Bitmap field 1520 includes a bitmap indicating the 20 MHz subchannels on which the EHT CF-End frames are sent or not sent.

Figure 16:
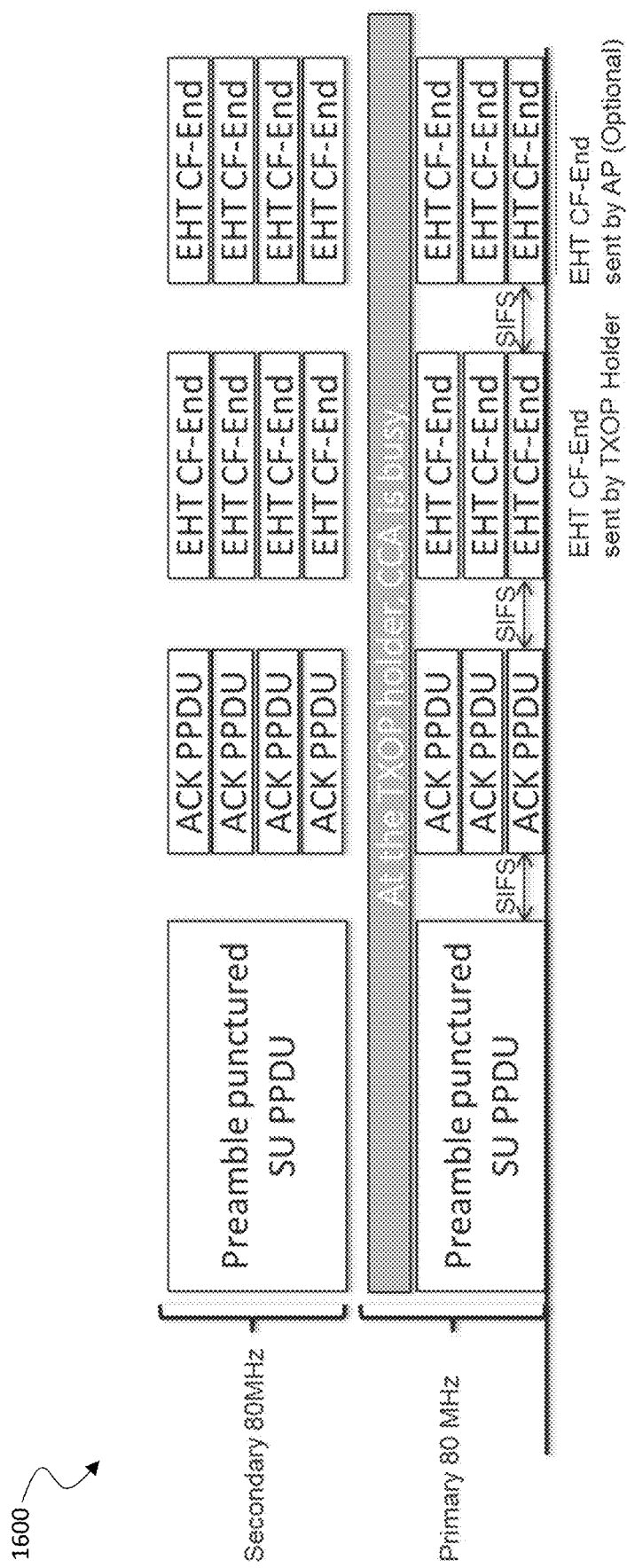
FIG. 16 is a block diagram of an exemplary transmission for performing EHT TXOP truncation using an EHT CF-End frame sent in a non-HT duplicate PPDU with preamble puncturing according to embodiments of the present invention.

FIG. 16 is a block diagram of an exemplary transmission 1600 for performing EHT TXOP truncation according to embodiments of the present invention. The EHT CF-End frame is sent in a non-HT duplicate PPDU with preamble puncturing. As depicted in FIG. 16, the TXOP holder transmits the EHT CF-End frame on the primary 80 MHz and the secondary 80 MHz channel. Because the TXOP holder indicates that the upper 20 MHz channel of the secondary 40 MHz channel is the disallowed subchannel, the AP transmits another EHT CF-End frame on the same channels with the received EHT CF-End frame excluding the disallowed subchannel indicated in the received EHT CF-End frame.

Figure 17:
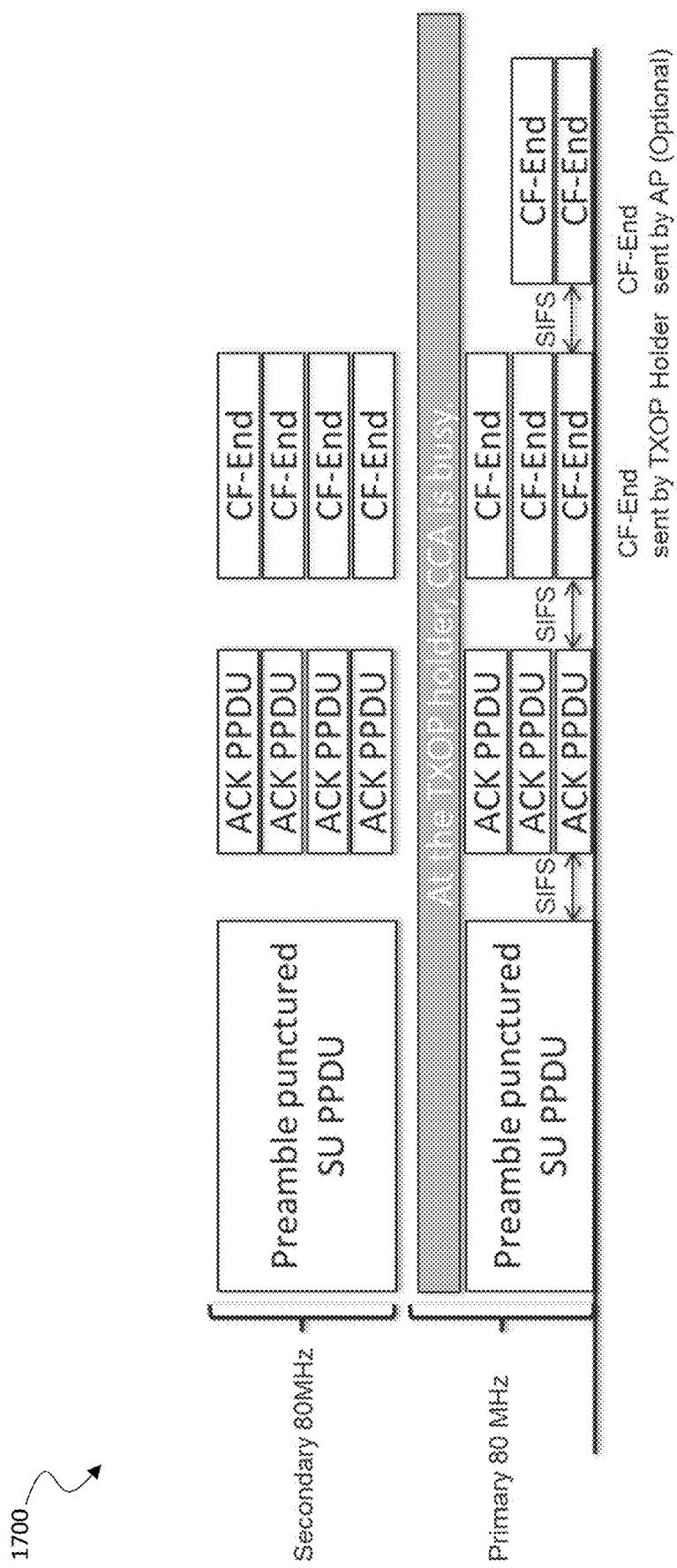
FIG. 17 is a block diagram of an exemplary transmission for performing EHT TXOP truncation for backward compatibility with legacy devices according to embodiments of the present invention.

FIG. 17 is a block diagram of an exemplary transmission 1700 for performing EHT TXOP truncation for backward compatibility with legacy devices according to embodiments of the present invention. The TXOP holder transmits a CF-End frame in a non-HT duplicate PPDU with preamble puncturing without a Disallowed/Usable Subchannel Bitmap. In this case, the TA is a bandwidth signaling TA and the CH_BANDWIDTH_IN NON_HT parameter in the CF-End frame indicates the maximum bandwidth among the primary channels (e.g., primary 20 MHz, primary 40 MHz, primary 80 MHz, primary 160/80+80 MHz, primary 240/160+80 MHz, and/or primary 320/160+160 MHz) that do not cover the preamble punctured channels. After an EHT AP receives a CF-End frame having a BSSID (TA) field indicating itself, it may respond by transmitting another CF-End frame after a SIFS. In this case, the EHT AP schedules the CF-End frame on the channels indicated by the CH_BANDWIDTH_IN_NON_HT parameter in the received CF-End frame.

In the example of FIG. 17, the TXOP holder transmits the CF-End frame on the primary 80 MHz channel and the secondary 80 MHz channel. The upper 20 MHz channel of the secondary 40 MHz channel is punctured. The AP transmits another CF-End frame on the primary 40 MHz channel according to the CH_BANDWIDTH_IN_NON_HT parameter in the received CF-END frame. The first CF-End frame is sent in a non-HT duplicate PPDU with preamble puncturing. The second CF-End frame is sent without preamble puncturing.

Figure 18:
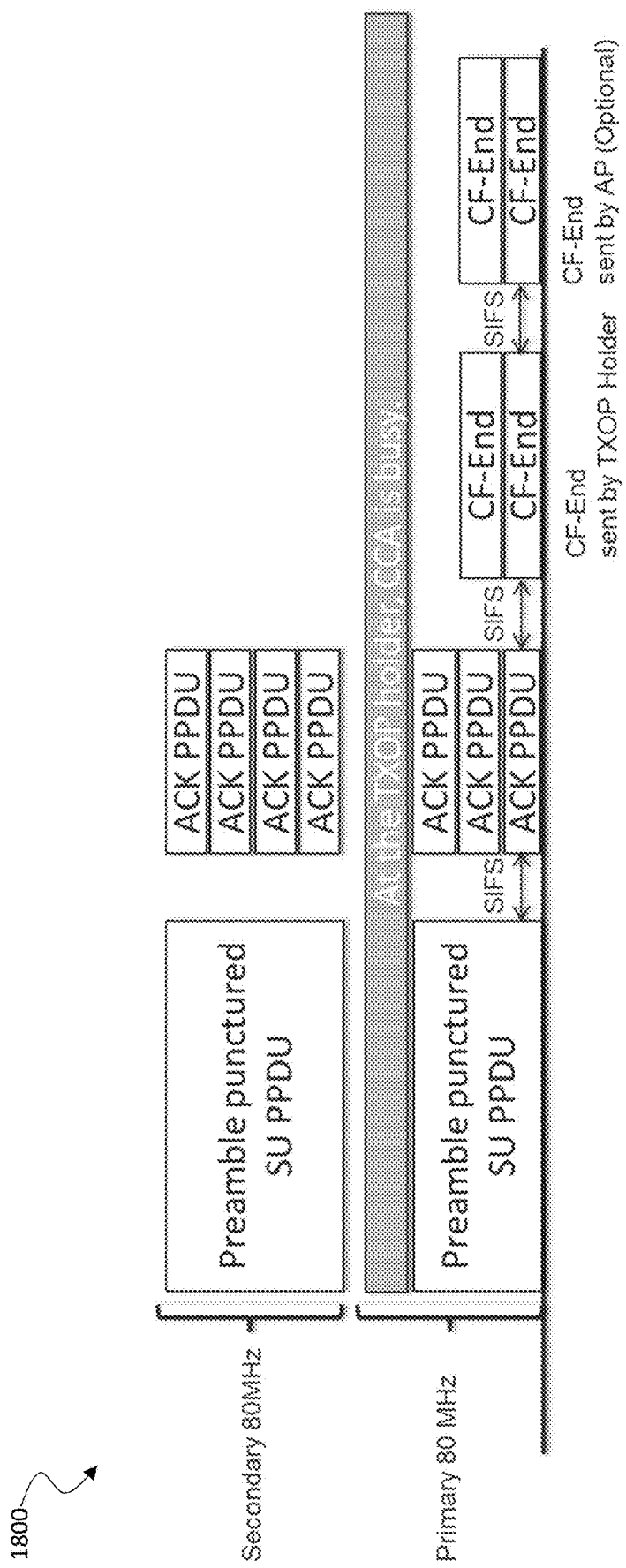
FIG. 18 is a block diagram of an exemplary transmission for performing EHT TXOP truncation for backward compatibility with legacy devices according to embodiments of the present invention.

FIG. 18 is a block diagram of an exemplary transmission 1800 for performing EHT TXOP truncation for backward compatibility with legacy devices according to embodiments of the present invention. In this example, the TXOP holder transmits a CF-End frame in a non-HT duplicate PPDU without preamble puncturing and the CH_BANDWIDTH parameter of the CF-End frame is set to the maximum bandwidth among the primary channels (e.g., primary 20 MHz, primary 40 MHz, primary 80 MHz, primary 160/80+80 MHz, primary 240/160+80 MHz, or primary 320/160+160 MHz) that does not cover the disallowed subchannels. The TXOP holder sets the TXVECTOR parameters CH_BANDWIDTH_IN_NON_HT and CH_BANDWIDTH to the same value. As depicted in FIG. 18, the TXOP holder transmits the CF-End frame on the primary 40 MHz channel. Because the CH_BANDWIDTH_IN_NON_HT parameter in the CF-END frame indicates the primary 40 MHz, the AP transmits another CF-End frame on the primary 40 MHz channel. Both CF-End frames are sent in a non-HT duplicate PPDU without preamble puncturing.

After an EHT AP receives a CF-End frame having a BSSID (TA) field indicating itself, it may respond by transmitting another CF-End frame after the SIFS. In this case, the EHT AP schedules the CF-End frame on the channels indicated by the CH_BANDWIDTH_IN_ NON_HT parameter in the received CF-End frame.

Figure 19:
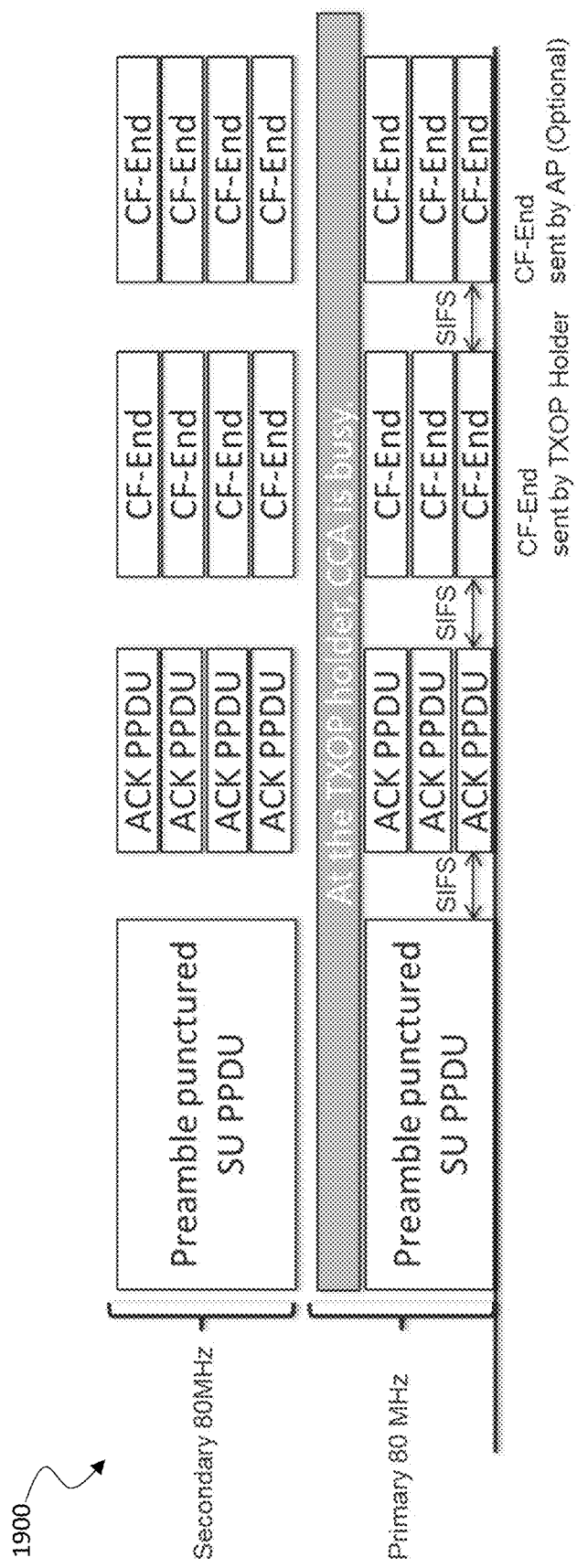
FIG. 19 is a block diagram of an exemplary transmission for performing EHT TXOP truncation for backward compatibility with legacy devices according to embodiments of the present invention.

FIG. 19 is a block diagram of an exemplary transmission 1900 for performing EHT TXOP truncation for backward compatibility with legacy devices according to embodiments of the present invention. In this example, the TXOP holder transmits a CF-End frame in a non-HT duplicate PPDU with preamble puncturing to the TXOP responder that is the TXOP holder's associated AP. The CF-End frame does not include a Disallowed/Usable Subchannel Bitmap. In this case, the TA is a bandwidth signaling TA and the TXOP holder sets the TXVECTOR parameters CH_BANDWIDTH_IN_NON_HT and CH_BANDWIDTH to the same value as the bandwidth the CF-END frames sent using the maximum bandwidth among the primary channels (e.g., primary 20 MHz, primary 40 MHz, primary 80 MHz, primary 160/80+80 MHz, primary 240/160+80 MHz, or primary 320/160+160 MHz) that cover all channels on which the CF-END frames are sent. As depicted in FIG. 19, the TXOP holder transmits the CF-End frame on the primary 80 MHz and secondary 80 MHz channel. The first and second CF-End frame are sent in a non-HT duplicate PPDU with preamble puncturing, where the upper 20 MHz channel of the secondary 40 MHz channel is punctured. The AP acting as a TXOP responder knows the Disallowed/Usable Subchannel Bitmap and transmits another CF-End frame on the same channels with the received EHT CF-End frame excluding the disallowed subchannels negotiated with the TXOP holder. According to some embodiments, the allowed/disallowed subchannels are determined according to BSS operating parameters announced by the wireless AP. In these embodiments, the set of allowed/disallowed subchannels is static.

After an EHT AP receives a CF-End frame as a TXOP responder having a BSSID (e.g., TA) field indicating itself, it may respond by transmitting another CF-End frame after the SIFS. The EHT AP schedules the CF-End frame on the 20 MHz channels indicated by CH_BANDWIDTH_IN_NON_HT parameter excluding the disallowed 20 MHz channels indicated in the Disallowed/Usable Subchannel Bitmap stored in the EHT AP. Because the EHT AP is a TXOP responder, it has stored the Disallowed/Usable Subchannel Bitmap exchanged during the HE RTS and CTS procedure.

EHT TXOP Truncation Procedure

A TXOP holder can truncate a TXOP by transmitting an EHT CF-END frame in a non-HT duplicate PPDU. The TXOP holder sets the CH_BANDWIDTH parameter to CBW40, CBW80, CBW160, CBW80+80, CBW240, CBW160+80, CBW320, and/or CBW160+160. The INACTIVE_SUBCHANNELS indicates the 20 MHz subchannels that are punctured, if any. The TXOP holder should set the TXVECTOR parameter CH_BANDWIDTH of a CF-End frame to the maximum bandwidth allowed by the rules in 10.23.2.8 (Multiple frame transmission in an EDCA TXOP).

When the TA is a bandwidth signaling TA, the transmitting STA sets the TXVECTOR parameters CH_BANDWIDTH_IN_NON_HT and CH_BANDWIDTH to the same value. An STA receiving an EHT CF-end frame interprets the reception of the frame as a network allocation vector (NAV) reset, e.g., causing the STA to reset its NAV to 0 at the end of the PPDU containing the EHT CF-end frame. After an EHT AP receives an EHT CF-End frame having a BSSID (TA) field indicating itself, it may respond by transmitting another EHT CF-End frame after SIFS. In this case, the EHT AP schedules the EHT CF-End frame on all 20 MHz subchannels on which the EHT CF-End frames were sent by the TXOP holder. The 20 MHz subchannels on which the EHT CF-End frames were sent by the TXOP holder can be signaled in a Disallowed Subchannel Bitmap information field or a Usable Subchannel Bitmap information field.

Exemplary EHT RTS/CTS Frame Exchange Process

Figure 20:
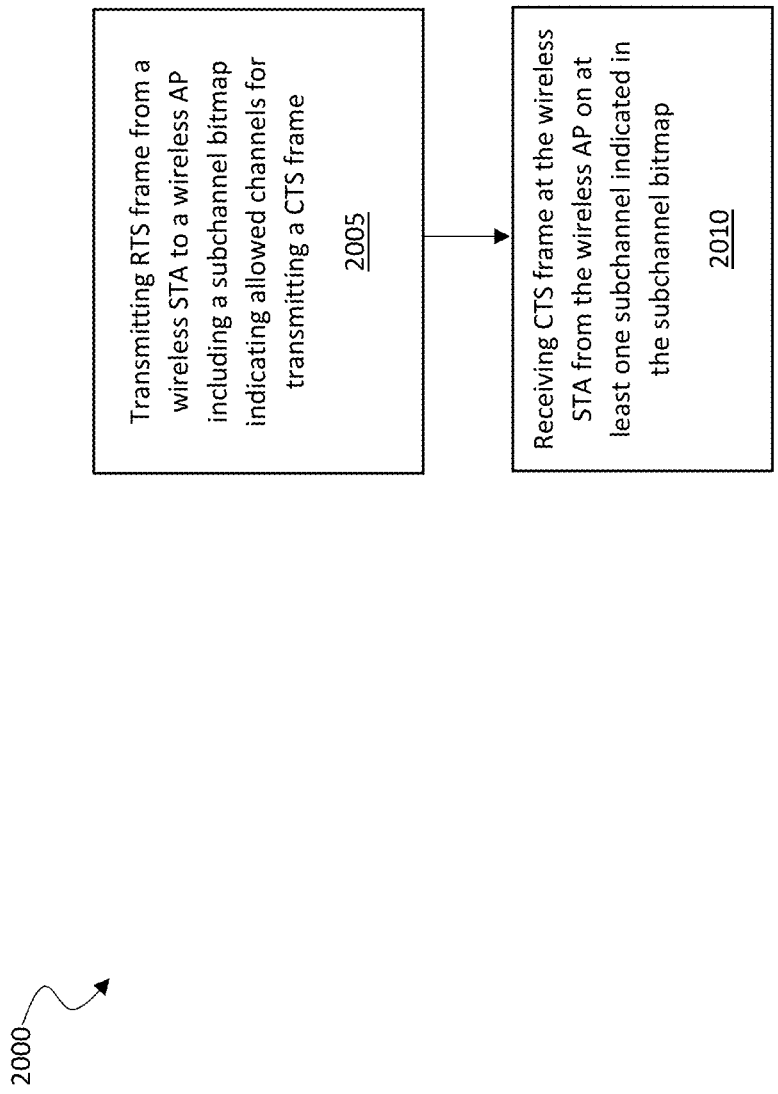
FIG. 20 is a flow chart depicting an exemplary EHT RTS/CTS frame exchange sequence performed by a wireless STA with preamble puncturing for 160+160 MHz/320 MHz channels according to embodiments of the present invention.

FIG. 20 is a flow chart depicting an exemplary EHT RTS/CTS frame exchange sequence 2000 with preamble puncturing for 160+160 MHz/320 MHz channels according to embodiments of the present invention.

At step 2005, an RTS frame is transmitted from a wireless STA to a wireless AP. The RTS frame can be an HE RTS, VHT RTS, or MU-RTS frame, for example. The RTS fame can be transmitted in a non-HT duplicate PPDU or a SU PPDU with a punctured preamble. The RTS frame includes a subchannel bitmap (e.g., an Allowed or Disallowed Subchannel Bitmap).

At step 2010, a CTS frame is received at the wireless STA on at least one subchannel indicated in the subchannel bitmap. The CTS frame is sent in a non-HT duplicate PPDU with preamble puncturing. The preamble puncturing is performed based on the subchannel bitmap as described above. For example, when the wireless STA and wireless AP communicate on a 160 MHz operating channel having a primary 80 MHz channel and a secondary 80 MHz channel, and the subchannel bitmap can indicate that an upper 20 MHz channel of the secondary 80 MHz is disallowed for transmission of the CTS frame. The CTS frame can be transmitted on a plurality of channels indicated in the subchannel bitmap.

Figure 21:
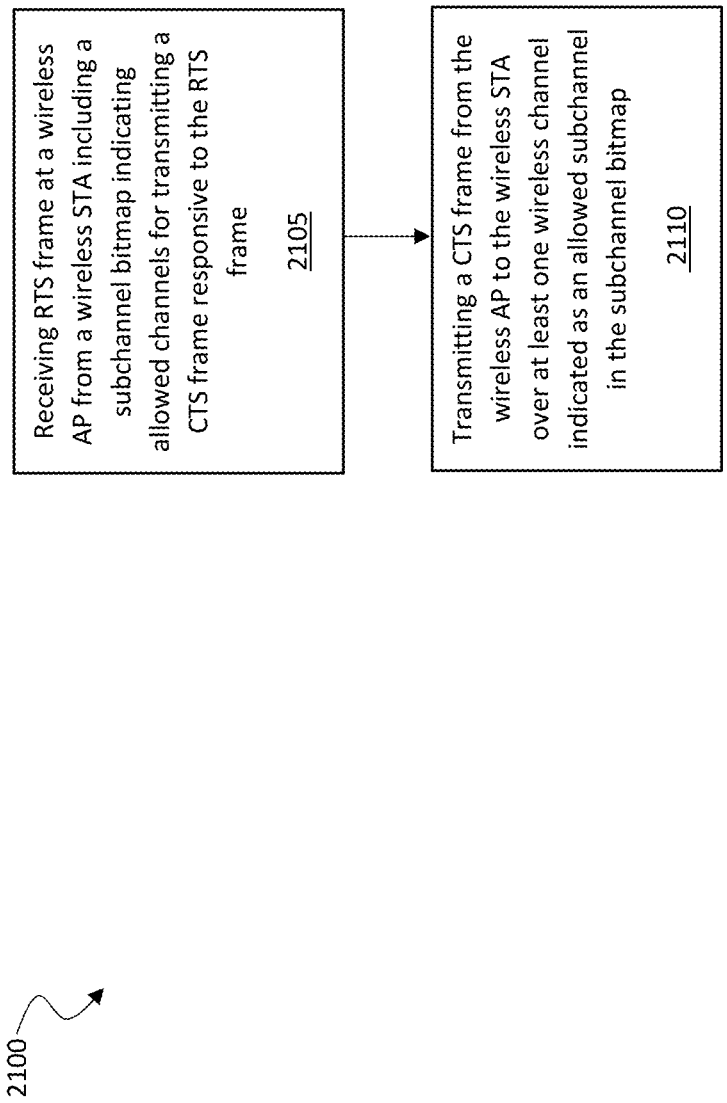
FIG. 21 is a flow chart depicting an exemplary EHT RTS/CTS frame exchange sequence performed by a wireless AP with preamble puncturing for 160+160 MHz/320 MHz channels according to embodiments of the present invention.

FIG. 21 is a flow chart depicting an exemplary EHT RTS/CTS frame exchange sequence 2100 with preamble puncturing for 160+160 MHz/320 MHz channels according to embodiments of the present invention.

At step 2105, an RTS frame is received from a wireless STA at a wireless AP. The RTS frame can be an HE RTS, VHT RTS, or MU-RTS frame, for example. The RTS fame can be transmitted in a non-HT duplicate PPDU or a SU PPDU with a punctured preamble. The RTS frame includes a subchannel bitmap (e.g., an Allowed or Disallowed Subchannel Bitmap).

At step 2110, a CTS frame is transmitted by the wireless STA to the wireless AP on at least one subchannel indicated in the subchannel bitmap. The CTS frame is sent in a non-HT duplicate PPDU with preamble puncturing. The preamble puncturing is performed based on the subchannel bitmap as described above.

Exemplary TXOP Truncation Frame Exchange Processes

Figure 22:
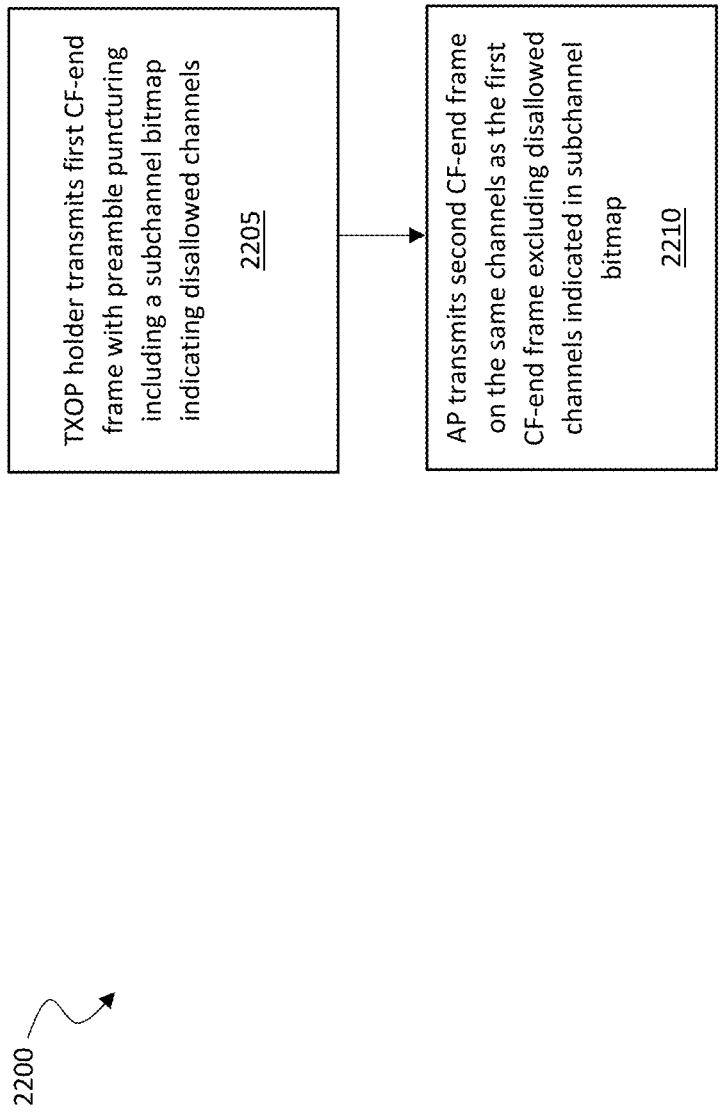
FIG. 22 is a flow chart depicting an exemplary process for transmitting an EHT CF-End frame to a legacy device for performing TXOP truncation according to embodiments of the present invention.

FIG. 22 is a flow chart depicting an exemplary process 2200 for transmitting an EHT CF-End frame to a legacy device for performing TXOP truncation according to embodiments of the present invention. For communicating with a legacy STA that is unable to recognize a CF-End frame, the TXOP holder transmits two CF-End frames.

At step 2205, the TXOP holder transmits the first EHT CF-End frame. The wireless AP that receives the EHT CF-End frame stores the Disallows/Usable Subchannel Bitmap information.

After a SIFS after transmitting the EHT CF-End frame, at step 2210, the TXOP holder transmits the legacy CF-End frame based on the stored the Disallowed/Usable Subchannel Bitmap information after the SIFS after receiving the EHT CF-End frame.

According to some embodiments, two legacy CF-End frames can be simultaneously transmitted by the TXOP holder and the AP.

Figure 23:
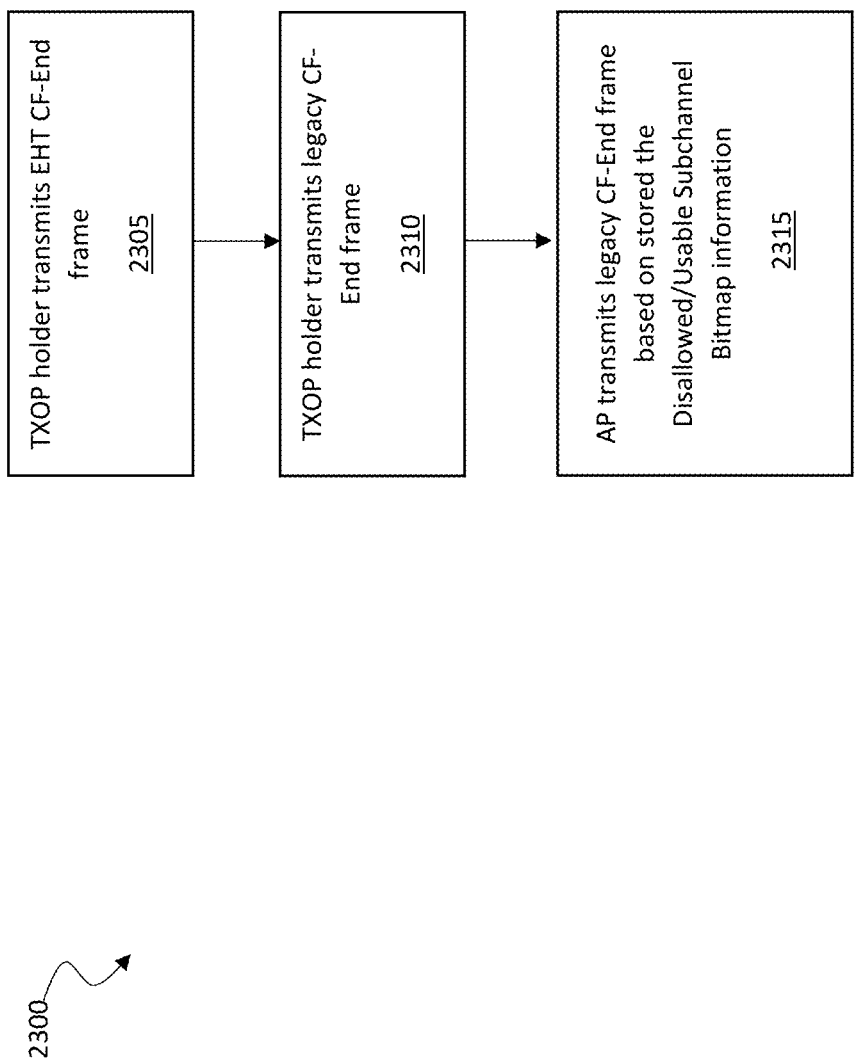
FIG. 23 is a flow chart depicting an exemplary process for transmitting an EHT CF-End frame to a legacy device after receiving a legacy-CF frame for performing TXOP truncation according to embodiments of the present invention.

FIG. 23 is a flow chart depicting an exemplary process 2300 for transmitting an EHT CF-End frame to a legacy device for performing TXOP truncation after receiving a legacy-CF frame according to embodiments of the present invention.

At step 2305, the TXOP holder transmits an EHT CF-End frame to a wireless AP. The EHT CF-End frame is stored by the recipient wireless AP.

At step 2310, the TXOP holder transmits a legacy CF-End frame.

At step 2315, after receiving the legacy CF-End frame, the wireless AP transmits a legacy CF-End frame based on stored the disallowed/usable subchannel bitmap information.

Exemplary Computer Controlled System

Figure 24:
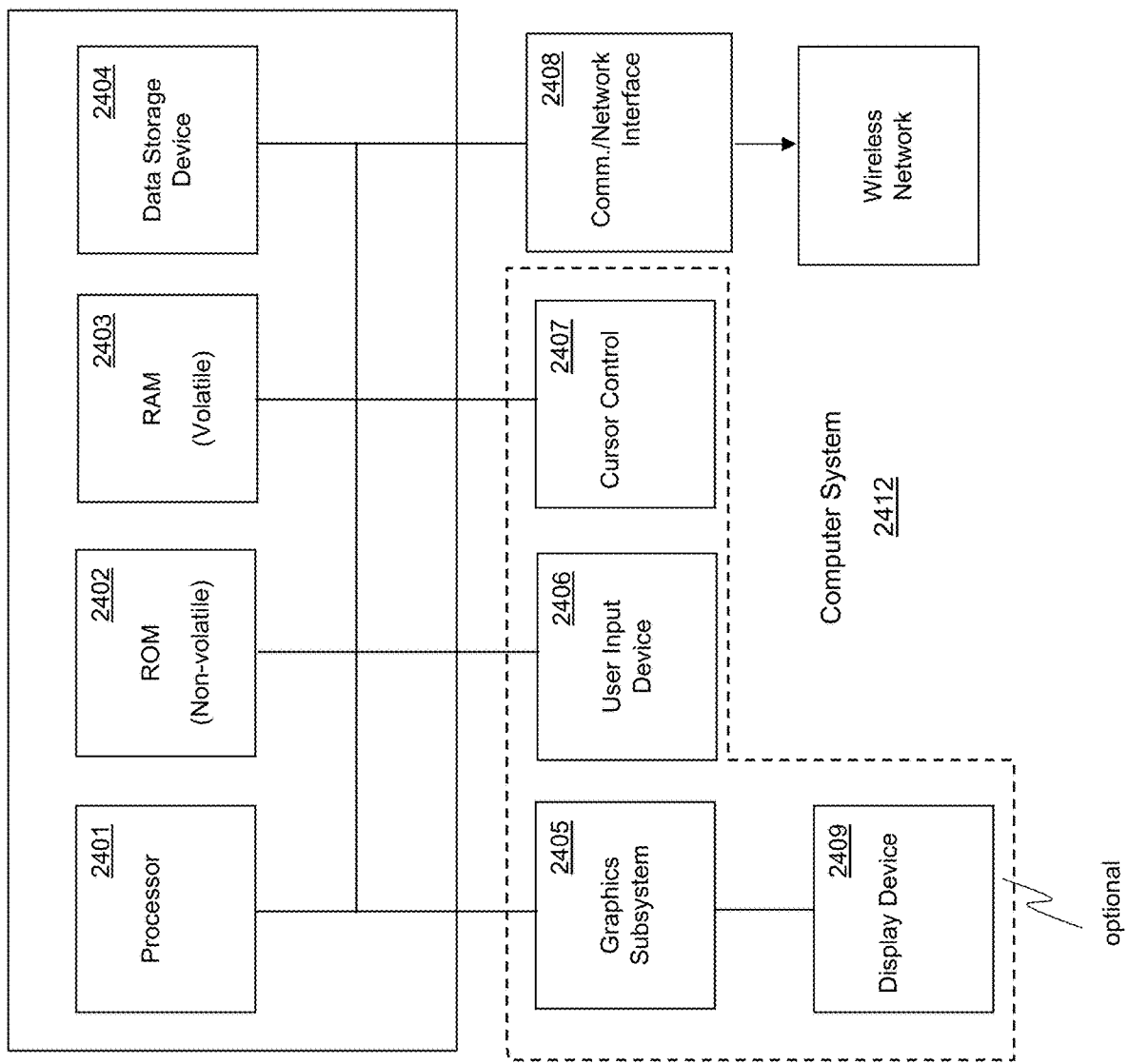
FIG. 24 is a block diagram of an exemplary computer platform upon which embodiments of the present invention can be implemented.

Embodiments of the present invention are drawn to electronic systems that perform EHT operations for a wireless network supporting a 160+160 MHz/320 MHz operating mode. RTS/CTS frame exchange sequences and TXOP truncation can be performed using punctured preambles according to subchannels indicated in a bitmap subfield (e.g., an Allowed Bitmap Subfield). In the example of FIG. 24, the exemplary computer system or wireless device 2400 includes a central processing unit (such as a processor or a CPU) 2401 for running software applications and optionally an operating system. Read-only memory 2402 and random access memory 2403 store applications and data for use by the CPU 2401. Data storage device 2404 provides non-volatile storage for applications and data and may include fixed disk drives, removable disk drives, flash memory devices, and CD-ROM, DVD-ROM or other optical storage devices. The optional user inputs 2406 and 2407 comprise devices that communicate inputs from one or more users to the computer system 2412 (e.g., mice, joysticks, cameras, touch screens, and/or microphones).

A communication or network interface 2408 includes a plurality of transceivers and allows the computer system 2412 to communicate with other computer systems, networks, or devices via an electronic communications network, including wired and/or wireless communication and including an Intranet or the Internet (e.g., 802.11 wireless standard). The network interface 2408 can perform multi-link operations (e.g., multi-link packet scheduling and channel access) using multiple wireless links to improve network throughput, for example. According to embodiments of the present invention, the communication or network interface 2408 can operate multiple transceivers simultaneously. The communication or network interface 2408 and can include a multi-band (e.g., dual-band) interface that can operate in multiple bands simultaneously, such as 2.4 GHz, 5 GHz, and/or 6 GHz.

The optional display device 2410 may be any device capable of displaying visual information in response to a signal from the computer system 2412 and may include a flat panel touch sensitive display, for example, and may be remotely disposed. The components of the computer system 2412, including the CPU 2401, memory 2402/2403, data storage 2404, user input devices 2406, and graphics subsystem 2405 may be coupled via one or more data buses.

Some embodiments may be described in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Embodiments of the present invention are thus described. While the present invention has been described in particular embodiments, it should be appreciated that the present invention should not be construed as limited by such embodiments, but rather construed according to the following claims.

What is claimed is:

1. A method of transmitting data in a wireless network, the method comprising:
    transmitting a request to send (RTS) frame from a wireless station (STA) for receipt by a wireless access point (AP), the RTS frame comprising:
        a subchannel bitmap indicating allowed subchannels and disallowed subchannels for transmitting a clear to send (CTS) frame; and
        a bandwidth control field comprising: a preamble puncture enabled subfield for indicating an enabled status for preamble puncturing; and a mode subfield for indicating between a static bandwidth indication and a dynamic bandwidth indication; and
    receiving the CTS frame at the wireless STA from the wireless AP on an 80 MHz channel comprising a 20 MHz subchannel indicated in the subchannel bitmap as a particular disallowed subchannel, wherein the CTS frame comprises a 20 MHz punctured preamble to avoid transmitting on the 20 MHz subchannel.

2. The method as described in claim 1, wherein the transmitting comprises transmitting the RTS frame in a non-HT duplicate PPDU with a punctured preamble.

3. The method as described in claim 1, wherein the transmitting comprises transmitting the RTS frame in a preamble punctured SU PPDU.

4. The method as described in claim 1, wherein the transmitting comprises transmitting the RTS frame in a 160 MHz operating channel of the wireless network.

5. The method as described in claim 4, wherein the 160 MHz operating channel comprises: a primary 80 MHz channel; and a secondary 80 MHz channel, and wherein the subchannel bitmap indicates that an upper 20 MHz channel of the secondary 80 MHz is disallowed for transmission of the CTS frame.

6. The method as described in claim 5, wherein the subchannel bitmap further indicates that an upper 40 MHz channel of the secondary 80 MHz channel is disallowed for transmission of the CTS frame.

7. The method as described in claim 1, wherein the RTS frame comprises an MU-RTS frame and the CTS frame comprises an MU-CTS frame.

8. The method as described in claim 1, further comprising receiving the CTS frame on a plurality of subchannels indicated in the subchannel bitmap.

9. The method as described in claim 1, wherein the CTS frame comprises a second subchannel bitmap indicating a plurality of idle subchannels of the subchannels indicated in the subchannel bitmap of the RTS frame, and wherein the CTS frame is transmitted on at least one of the plurality of idle subchannels.

10. The method as described in claim 1, wherein the CTS frame comprises a second subchannel bitmap indicating the same channels indicated in the subchannel bitmap of the RTS frame.

11. The method as described in claim 1, wherein the CTS frame is transmitted in a non-HT duplicate PPDU using preamble puncturing.

12. A method of transmitting data in a wireless network, the method comprising:
    receiving a request to send (RTS) frame at a wireless access point (AP) from a wireless station (STA), wherein the RTS frame comprises:

a subchannel bitmap indicating allowed subchannels and disallowed subchannels for transmitting a clear to send (CTS) frame responsive to the RTS frame; and a bandwidth control field comprising: a preamble puncture enabled subfield for indicating an enabled status for preamble puncturing; and a mode subfield for indicating between a static bandwidth indication and a dynamic bandwidth indication; and transmitting the CTS frame from the wireless AP to the wireless STA over an 80 MHz wireless channel comprising a 20 MHz subchannel, indicated as a particular disallowed subchannel in the subchannel bitmap, wherein the CTS frame comprises a 20 MHz punctured preamble to avoid transmitting on the 20 MHz subchannel.

13. The method as described claim 12, further comprising transmitting the CTS frame on a plurality of subchannels indicated as allowed subchannels in the subchannel bitmap.

14. The method as described in claim 12, wherein the CTS frame comprises a second subchannel bitmap indicating a plurality of idle subchannels of the subchannels indicated in the subchannel bitmap of the RTS frame, and further comprising transmitting the CTS frame on at least one of the plurality of idle subchannels.

15. The method as described in claim 12, wherein the CTS frame comprises a second subchannel bitmap indicating the same channels indicated in the subchannel bitmap of the RTS frame.

16. The method as described in claim 12, wherein said transmitting the CTS frame comprises transmitting the CTS frame in a non-HT duplicate PPDU using preamble puncturing.

17. A wireless device, comprising:

a processor; and a network interface under control of said processor and operable to transmit data over a wireless network, and wherein the processor is operable to cause the network interface to:

transmit a request to send (RTS) frame for receipt by a wireless access point (AP), the RTS frame comprising:

a subchannel bitmap indicating allowed subchannels and disallowed subchannels for transmitting a clear to send (CTS) frame; and a bandwidth control field comprising: a preamble puncture enabled subfield for indicating an enabled status for preamble puncturing; and a mode subfield for indicating between a static bandwidth indication and a dynamic bandwidth indication; and receive the CTS frame from the wireless AP on an 80 MHz channel comprising a 20 MHz subchannel indicated in the subchannel bitmap as a particular disallowed subchannel, wherein the CTS frame comprises a 20 MHz punctured preamble to avoid transmitting on the 20 MHz subchannel.

18. The wireless device as described in claim 17, wherein the transmit an RTS frame comprises transmitting the RTS frame in a non-HT duplicate PPDU with a punctured preamble.

19. The wireless device as described in claim 17, wherein the transmit an RTS frame comprises transmitting the RTS frame in a preamble punctured SU PPDU.

* * * * *